April 7, 1959     A. M. BROTHERS     2,880,646
PORTABLE PHOTOGRAPHIC FILM VIEWER
Filed Oct. 1, 1956
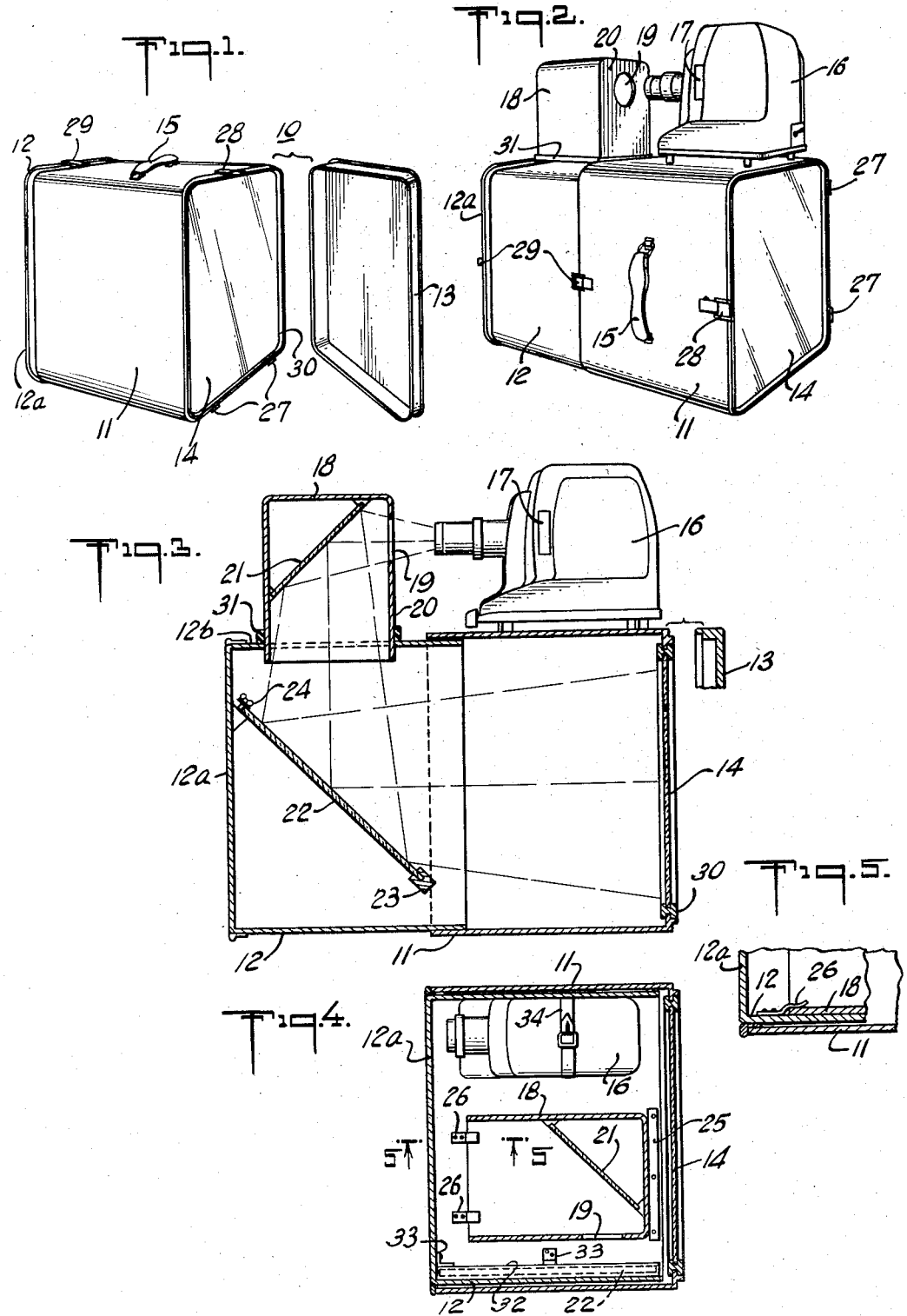

United States Patent Office 2,880,646
Patented Apr. 7, 1959

2,880,646

PORTABLE PHOTOGRAPHIC FILM VIEWER

Arthur M. Brothers, Pleasantville, N.Y.; Harriette Morrell, executrix of said Arthur M. Brothers, deceased Application October 1, 1956, Serial No. 613,057

6 Claims. (Cl. 88—24)

The present invention relates to a portable photographic film viewer and, more particularly, to portable apparatus for convenient viewing of photographic films by one or more persons in an area which may be well lighted, even as by daylight.

Prior art systems for viewing photographic films by a group of persons generally utilize bulky apparatus which must be used at night or in a darkened area. One type of such a prior art system which is presently in common use includes a projector, a casing in which the projector is generally carried or stored when not in use and separate viewing apparatus including a reflection screen and suitable supporting members therefor. During the operation of such prior art apparatus the projector is removed from the casing and placed upon a supporting surface, such as a table or desk, and the reflection screen is positioned directly in front of the projector to receive thereon a focused image from the projector. The casing, which must be of considerable size in order to house the projector, serves no useful purpose when this apparatus is in operation.

It is an object of this invention to provide easily portable apparatus for the projection and viewing of photographic film.

It is another object of this invention to provide easily portable apparatus for the viewing of photographic film on a translucent screen comparable in size and illumination with contemporary home television receivers.

Yet another object of this invention is to provide a viewing system producing an image which may be readily viewed either in a light or darkened area.

In accordance with the present invention an improved portable photographic film viewer is provided which comprises a casing including an opaque outer casing member having openings at opposite ends thereof, an opaque inner casing member which telescopes into the outer casing member, a periscopic member which projects from the inner casing member and which is adapted to receive a substantially horizontal beam of light from, for example, a slide projector, and first and second light deflectors or reflectors disposed within the periscopic and inner casing members, respectively, so as to direct the beam of light to the rear surface of a translucent viewing screen mounted in one of the openings of the outer casing member. When the viewer is not in use, a cover member may be attached to the outer casing member and superimposed over the viewing screen, and the projector and periscopic member may be securely placed within the inner casing member which may then be fully telescoped or collapsed into the outer casing member to close the other opening of the outer casing member and, thus, to provide a compact lightweight portable photographic film viewer.

In order that the invention may be more clearly understood and readily carried into effect, it will now be described more fully with reference to the accompanying drawing in which:

Fig. 1 is a perspective of an embodiment of a photographic film viewer of my invention shown in the portable position with the cover member detached therefrom;

Fig. 2 is a perspective of an optical system including my portable photographic film viewer shown in the operative position;

Fig. 3 illustrates an optical system which includes a vertical cross-sectional view of the photographic film viewer shown in Fig. 2;

Fig. 4 is a horizontal cross-sectional view of my photographic film viewer shown in the portable position with a projector securely placed therein; and Fig. 5 is a cross-sectional view of a portion of my photographic film viewer taken through the line 5—5 of Fig. 4.

Referring to the figures of the drawing, wherein like reference numerals refer to similar parts, and more particularly to Fig. 1, a casing 10 of the viewer comprises an opaque outer casing 11 having openings at opposite ends thereof, an opaque inner casing member 12 which is adapted to telescope into the outer casing member and which is provided with a side 12a which closes one of the openings in the outer casing member 11 when the inner casing member 12 is fully telescoped or collapsed into the outer casing member 11, and a cover member 13 adapted to close the other opening in the outer casing member 11 when the viewer is to be transported. The casing 10 is preferably made of durable lightweight material, such as plastic or plywood, or a combination of such materials. A suitable translucent and preferably flexible viewing screen 14 is mounted on the outer casing member 11 in the open end thereof adapted to be closed by the cover 13. A rubber gasket or frame 30 may be advantageously used to secure the screen 14 to the outer casing member 11. The viewing screen 14 is preferably made of a methacrylate, such as commonly known Plexiglas or Lucite, glass or vinyl material. When the casing 10 is in the portable position, removable hinges 27 and one or more clasps 28 may be used to secure the cover member 13 to the outer casing member 11, and one or more clasps 29 may be used to secure the inner casing member 12 to the outer casing member 11. A handle 15 is attached to the outer casing member 11 for conveniently transporting the photographic film viewer.

Fig. 2 is a perspective of an optical system including my photographic film viewer shown in the operative position and a slide or transparency projector 16 which may be used in conjunction therewith. The projector 16 may be anyone of many well known types of commonly used slide projectors which comprises a light source of, say 200 to 500 watts, a reflecting and condensing system and a projection lens preferably a wide angle lens. The light source and the reflecting and condensing system of the projector 16 provide a beam of light which passes through a film slide or transparency, for example, a 2" x 2" transparency, placed in a slot 17 of the projector 16 to produce an image which is projected onto a screen by the projection lens of the projector 16. In the operative position the projector 16 may be seated on the outer casing member 11, the inner casing member 12 is extended from the outer casing 11, and a periscopic member 13 is projected from an opening in the top side 12b of the inner casing member 12 to intercept the beam of light projected from the projector 16. The periscopic member 18 is in the form of an open ended container having an aperture or opening 19 in its front side 20 facing the projector 16 of a size permitting the beam of light to pass therethrough.

Fig. 3 illustrates an optical system which includes a vertical cross-sectional view of the photographic film viewer shown in its operative position in Fig. 2. The projector 16 is adapted to be seated on the outer casing member 11 and project a substantially horizontal beam of light through the aperture 19 of side 20, which is disposed 90° to the open end of periscopic member 18, to a front surfaced mirror 21 which is fixedly mounted at an angle in periscopic member 18. Periscopic member 18 is snugly fitted in the opening in side 12b of the inner casing member 12 and the open bottom end of the periscopic member 18 is disposed within the inner casing member 12. In order to place the aperture 19 in a position which will permit the beam of light projected from variously constructed projectors to pass therethrough to the mirror 21, the position of the periscopic member 18 is adjustable with respect to inner casing member 12. The periscopic member 18 may be held in a given vertical position by frictional engagement between its sides and the side 12b of inner casing member 12, or a removable resilient band 31, for example, a rubber band, may be placed firmly around the periscopic member 18 to act as a stop when engaging side 12b of inner casing member 12. The inner casing member 12, in addition to having an opening in its top side 12b, has an open forward end disposed 90° to side 12b and within the outer casing member 11.

The horizontal beam of light projected from the projector 16 through aperture 19 is deflected downward substantially 90° by the front surfaced mirror 21 through the open lower end of the periscopic member 18 into the inner casing member 12. Another front surfaced mirror 22, having a reflecting surface substantially larger than that of the mirror 21, is removably mounted at an angle in the inner casing member 12 by means of a slotted bar 23 and a thumb nut clamp 24. This larger mirror 22 is positioned to intercept the downwardly directed beam of light and to deflect it in a horizontal direction to the rear surface of the translucent viewing screen 14. An image projected by this beam of light may be viewed on the front surface of the viewing screen 14.

It can be readily seen that this photographic film viewer may be used in both dark rooms and ordinary daylight since the only light which strikes the rear surface of the translucent viewing screen 14 is substantially the beam of light projected by the projector 16. The image projected on the viewing screen 14 may be in color or black and white and may have dimensions of, for example, 15" x 15" when the effective distance between the projection lens of the projector 16 and the surface of the viewing screen 14 is 30 inches. With an effective distance of 30 inches between the projector 16 and the viewing screen 14, the viewing screen 14 may have either a flat surface or a curved surface since this distance is sufficiently great to prevent noticeable distortion of the image on either type of screen. The dimensions of the image on screen 14 may be increased or decreased by increasing or decreasing the effective distance between the projector 16 and the screen 14. This change in effective distance can be produced by contracting or extending the viewer in either the horizontal or vertical directions by simply sliding the inner casing member 12 out of or into the outer casing member 11 or sliding the periscopic member 18 out of or into the inner casing member 11.

It can also be seen that by increasing the distance between the projector 16 and the aperture 19, or by changing the size or shape of aperture 19, an unwanted portion of a film transparency may be easily masked to get a preview of a desired portion of the transparency on the viewing screen 14 without in any way damaging the transparency.

To place the viewer in its portable or collapsed position, as shown in Figs. 4 and 5, the mirror 22 mounted in the inner casing member 12 is removed from its operative position and stored in a protective soft bag 32 held against a side of the inner casing member 12 by retaining member 33. This leaves the inner casing member 12 free to receive the periscopic member 18 and the projector 16. The periscopic member 18 may be securely held in place by the heel block 25 and clips 26, and one or more binding straps 34 may be used to secure the projector 16 in the inner casing member 12. The inner casing member 12 is then collapsed into the outer casing member 11 and made secure thereto with the clasp 29, and the cover member 13 is attached to the outer casing member 11 over the viewing screen 14 by means of the removable hinges 27 and clasp 28. In the portable or collapsed position the entire optical system can be carried as a small piece of hand luggage and fashioned to the appearance of "airplane hand luggage."

Although the portable photographic film viewer has been described in conjunction with a slide projector, it is to be understood that a wide variety of photographic projectors including projectors for 35 mm. still slides, 35 mm. strip film and both 8 and 16 mm. motion picture strip film may be used.

While a preferred embodiment of the invention has been illustrated and described, it is understood that modifications of this embodiment may be made without departing from the spirit of the invention. It is therefore intended to cover such modifications as well as the preferred embodiment of the invention within the scope of the appended claims.

I claim:

1. A portable photographic film viewer comprising a casing including an opaque outer casing member having openings at opposite ends thereof, an opaque inner casing member having an open end and a side having an opening therein, and a cover member, a periscopic opaque container member having an opening at one end and a side having an aperture therein, first and second front surfaced mirrors, and a viewing screen closing one end of said outer casing member, said inner casing member being adapted to telescope into said outer casing member through the other end of said outer casing member, the open end of said inner casing member being disposed within said outer casing member, said periscopic member being adapted to snugly fit into the opening in the side of said inner casing member with the open end of said periscopic member being disposed within said inner casing member, said first mirror being disposed in said periscopic member to receive light from the aperture in the side of said periscopic member and to deflect said light through the open end of said periscopic member into said inner casing member, said second mirror being disposed in said inner casing member to deflect the light from said first mirror to the rear surface of said viewing screen, said cover member being adapted to attach to said outer casing member to protect said screen when in transit.

2. A portable photographic film viewer comprising a casing including an opaque outer casing member having openings at opposite ends thereof and an opaque inner casing member having an opening at one end and a side having an opening therein, a periscopic opaque container member having an opening at one end and a side having an aperture therein, a first front surfaced mirror, a second front surfaced mirror and a translucent viewing screen covering one of the open ends of said outer casing member, said inner casing member being adapted to telescope into said outer casing member, the open end of said inner casing member being disposed within said outer casing member, said periscopic member being adapted to fit snugly into the opening in the side of said inner casing member, the open end of said periscopic member being disposed within said inner casing member, said first mirror being disposed in said periscopic member to intercept a beam of light from the aperture in the side of said periscopic member and to deflect said beam through the open end of said periscopic member into the inner casing member, said second mirror being disposed in said inner casing member to receive the beam of light from said first mirror and to deflect the received beam of light to the rear surface of said viewing screen.

3. A viewer as set forth in claim 2 wherein the aperture in the side of said periscopic member has an area which is small relative to the area of the side of said periscopic member.

4. A viewer as set forth in claim 2 wherein said periscopic member has exterior dimensions substantially smaller than the interior dimensions of said inner casing member.

5. A photographic film viewer comprising a casing including an opaque outer casing member having openings at opposite ends thereof and an opaque inner casing member having openings in each of two sides disposed substantially 90° to each other, an opaque periscopic member having the form of a container and having openings in each of two sides disposed substantially 90° to each other, said periscopic member being adapted to snugly slide within the opening of one of the two sides of said inner casing member, a translucent viewing screen mounted in one of the openings of said outer casing member, said inner casing member being adapted to telescope into said outer casing member through the other opening of said outer casing member, the other openings of said casing members being disposed to readily pass light from within said inner casing member through said outer casing member to said viewing screen, and first and second front surfaced mirrors, said first mirror being mounted within said periscopic member for deflecting a beam of light received from one opening through the other opening of said periscopic member to said inner casing member, said second mirror being arranged within said inner casing member to deflect the beam of light received from said first mirror to the rear surface of said viewing screen.

6. A portable optical system comprising a photographic film projector adapted to project an image-producing beam of light and a photographic film viewer comprising a casing including an opaque outer casing member having openings at opposite ends thereof and an opaque inner casing member having an opening at one end and a side having an opening therein, an opaque periscopic member having the form of a container and having an opening at one end and a side having an aperture therein disposed to receive the beam of light from said projector, first and second front surfaced mirrors and a translucent viewing screen covering one of the open ends of said outer casing member, said inner casing member being adapted to telescope into said outer casing member through the other open end of said outer casing member, the open end of said inner casing member being disposed within said outer casing member, said periscopic member being adapted to fit snugly into the opening in the side of said inner casing member, the open end of said periscopic member being disposed within said inner casing member, said first mirror being disposed in said container to deflect said beam of light through the open end of said periscopic member into the inner casing member, said second mirror being disposed in said inner casing member to deflect said beam to the rear surface of said viewing screen, whereby an image is clearly distinguishable on the front surface of the viewing screen without the necessity of operating the system in a darkened area.

References Cited in the file of this patent

UNITED STATES PATENTS

| 2,268,450 | Haggett | Dec. 30, 1941 |

FOREIGN PATENTS

| 358,995 | Germany | Sept. 19, 1922 |
| 1,047,382 | France | July 22, 1953 |